United States Patent [19]

Brockhaus et al.

[11] Patent Number: 4,589,332
[45] Date of Patent: May 20, 1986

[54] FLASHING SYSTEM FOR A GRAIN DRYING BIN

[75] Inventors: Donald B. Brockhaus; Calvin L. Fuehrer, both of Fremont; Walter E. Swartz, Wahoo, all of Nebr.; Vernon H. Sietmann, Laurel, Iowa

[73] Assignee: Stormor, Inc., Fremont, Nebr.

[21] Appl. No.: 771,596

[22] Filed: Sep. 3, 1985

[51] Int. Cl.⁴ .............................. E04H 7/22
[52] U.S. Cl. ............................. 98/55; 52/246; 52/303; 52/588
[58] Field of Search .......... 98/55; 52/245, 246, 52/247, 302, 303, 588

[56] References Cited

U.S. PATENT DOCUMENTS

| | | | |
|---|---|---|---|
| 1,977,391 | 10/1934 | Kramer | 98/55 |
| 1,981,434 | 11/1934 | Shodron | 98/55 |
| 2,818,009 | 12/1957 | Steffen | 98/55 |
| 3,283,459 | 11/1966 | Beranek et al. | 55/302 |
| 3,501,845 | 3/1970 | Seitmann | 34/33 |
| 3,555,762 | 1/1971 | Costanzo, Jr. | 52/588 |
| 3,591,994 | 7/1971 | Steffen | 52/303 |
| 3,943,636 | 3/1976 | Seitmann et al. | 34/56 |
| 4,035,928 | 7/1977 | Seitmann et al. | 98/55 |
| 4,037,527 | 7/1977 | Steffen | 98/55 |

Primary Examiner—Ronald C. Capossela
Attorney, Agent, or Firm—Zarley, McKee, Thomte, Voorhees & Sease

[57] ABSTRACT

A flashing system for a grain drying bin is described to prevent the accumulation of grain between the juncture of the grain drying floor positioned within the bin and the interior surface of the vertical wall of the bin. The flashing system is comprised of a plurality of flashing members secured together in an end-to-end relationship so as to extend around the entire inner wall surface of the bin at the lower end of the drying floor. The upper ends of the flashing members are secured to the wall of the bin and extend downwardly and inwardly therefrom to the perforated drying floor.

2 Claims, 7 Drawing Figures

FLASHING SYSTEM FOR A GRAIN DRYING BIN

BACKGROUND OF THE INVENTION

This invention relates to a grain drying bin and more particularly to a grain drying bin having a flashing system provided at the lower end of a grain drying floor positioned within the bin.

In grain drying bins such as disclosed in U.S. Pat. Nos. 3,501,845; 3,943,636 and 4,035,928, a grain drying floor is provided within the bin above the lower end thereof. The grain to be dried is deposited on the perforated drying floor with the drying air being passed upwardly through the grain to dry the same. When the grain has been dried, the grain is normally dumped through troughs or dump chutes located at the lower end of the drying floor.

A problem associated with the grain bins of the type described herein is that a small amount of grain tends to accumulate at the lower end of the drying floor adjacent the inside surface of the bin. The grain which accumulates at the juncture of the drying floor and the bin tends to spoil.

Therefore, it is a principal object of the invention to provide a flashing system for a grain bin.

A further object of the invention is to provide a flashing system which is positioned between the lower end of a grain drying floor and the inside wall surface of the bin to reduce the accumulation of grain at the juncture of the grain drying floor and the bin.

A further object of the invention is to provide a flashing system which is designed to be used in conjunction with a grain drying bin having a grain drying floor positioned in the upper end thereof.

These and other objects will be apparent to those skilled in the art.

SUMMARY OF THE INVENTION

A flashing system for a grain drying bin is disclosed to prevent the accumulation of grain at the juncture of the grain drying floor and the inside surface of the vertical wall of the bin. The flashing system is comprised of a plurality of flashing members which are secured together in an end-to-end relationship and which extend around the inside surface of the bin wall. The upper ends of the flashing members are secured to the wall of the bin with the lower ends thereof being secured to the lower end of the perforated grain drying floor. The flashing system extends downwardly and inwardly from the upper end thereof so that the accumulation of grain between the grain drying floor and the inside wall surface of the bin is reduced.

DESCRIPTION OF THE PREFERRED EMBODIMENT

The numeral 10 generally designates a grain bin of the drying type such as disclosed in U.S. Pat. No. 3,501,845. The bin 10 is capable of drying granular material on the perforated drying floor 12 in the manner described in U.S. Pat. No. 3,501,845.

Figure 1:
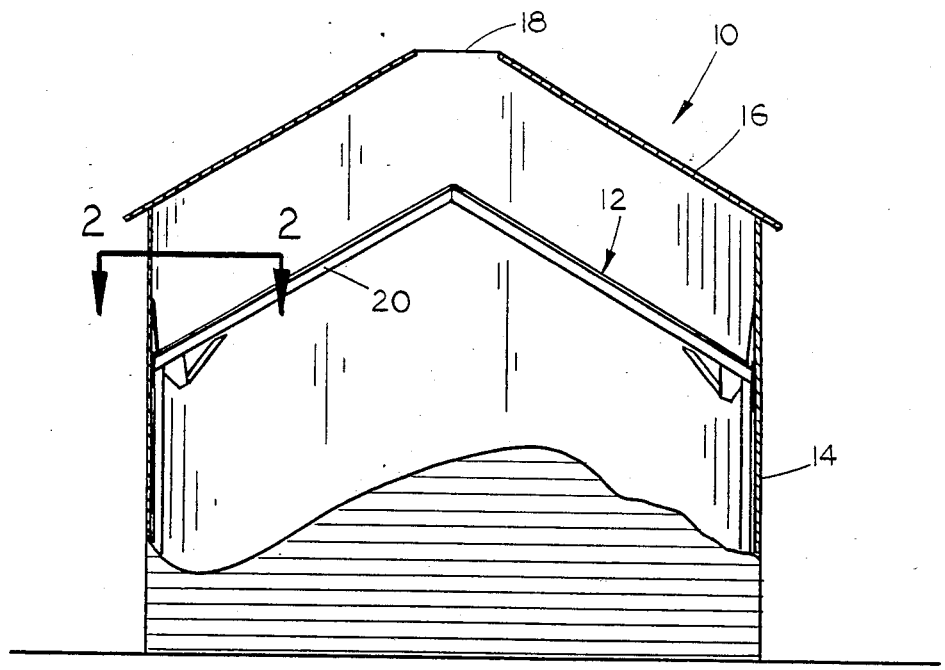
FIG. 1 is a partial sectional view of a grain bin having the flashing system of this invention incorporated therein.

The grain bin 10 comprises a side wall 14 and a conical shaped roof 16 mounted thereon. An opening 18 is formed in the apex of the roof 16 as seen in FIG. 1 and which may be closed by a suitable cover (not shown). Bin 10 preferably includes a base floor (not shown) and conventional grain drying equipment such as in U.S. Pat. No. 3,501,845.

Drying floor 12 comprises a plurality of radially extending and spaced-apart support members or rafters 20 and 21 which extend downwardly and outwardly from the upper center of the bin. The upper ends of the support members 20 and 21 are joined together by any suitable means. Positioned over the support members 20 and 21 are a plurality of perforated panels 22 joined together at their adjacent side edges. Panels 22 are secured to roof pipes 23 which are secured to the rafters 20 and 21.

Figure 2:
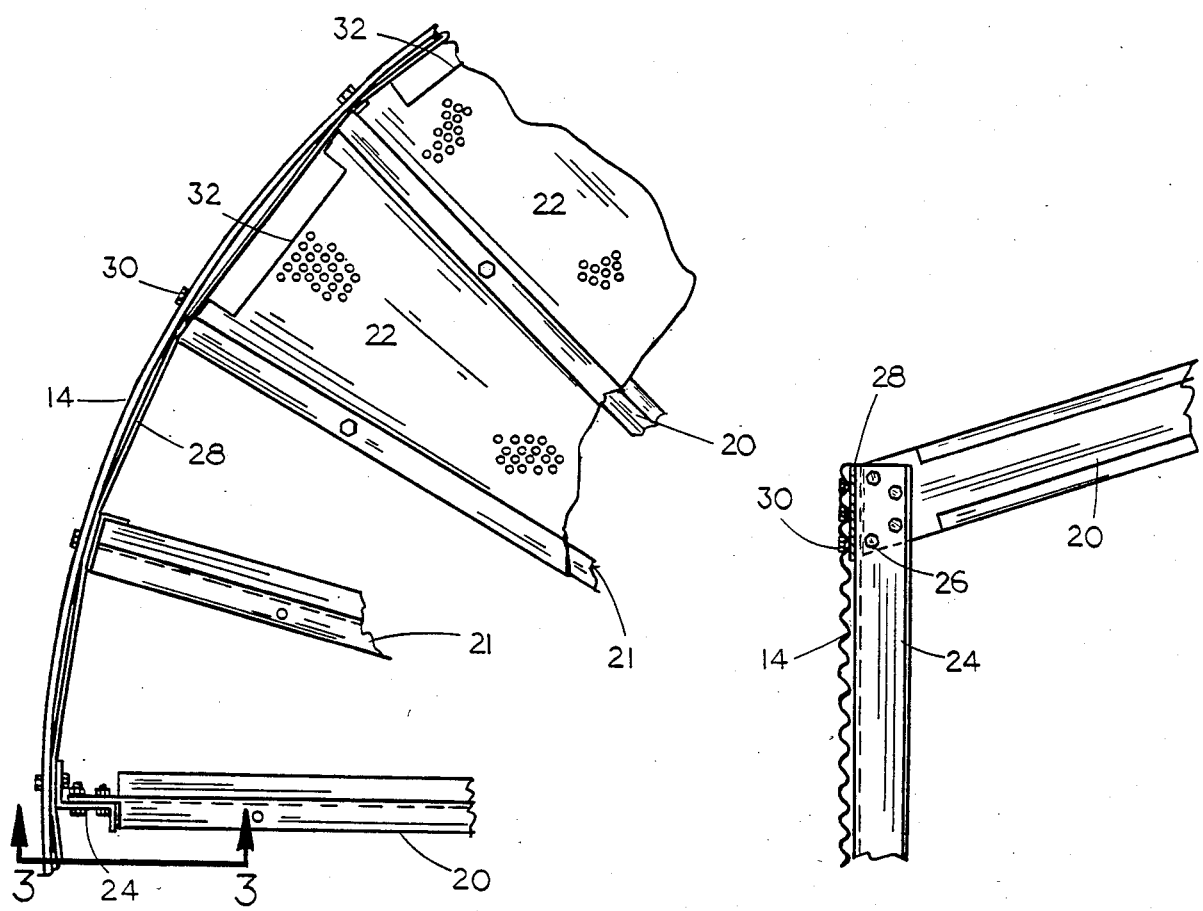
FIG. 2 is an enlarged sectional view taken on lines 2—2 of FIG. 1.
Figure 3:
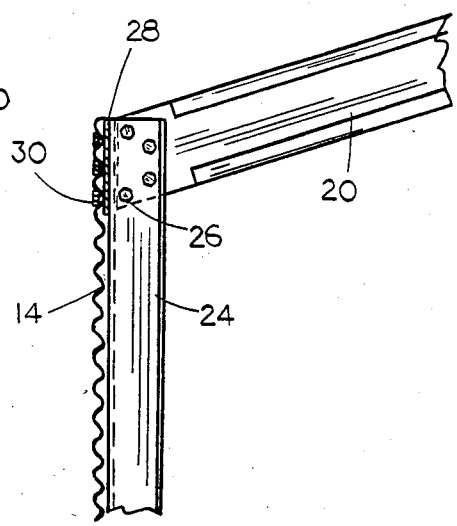
FIG. 3 is a sectional view taken on lines 3—3 of FIG. 2.
Figure 4:
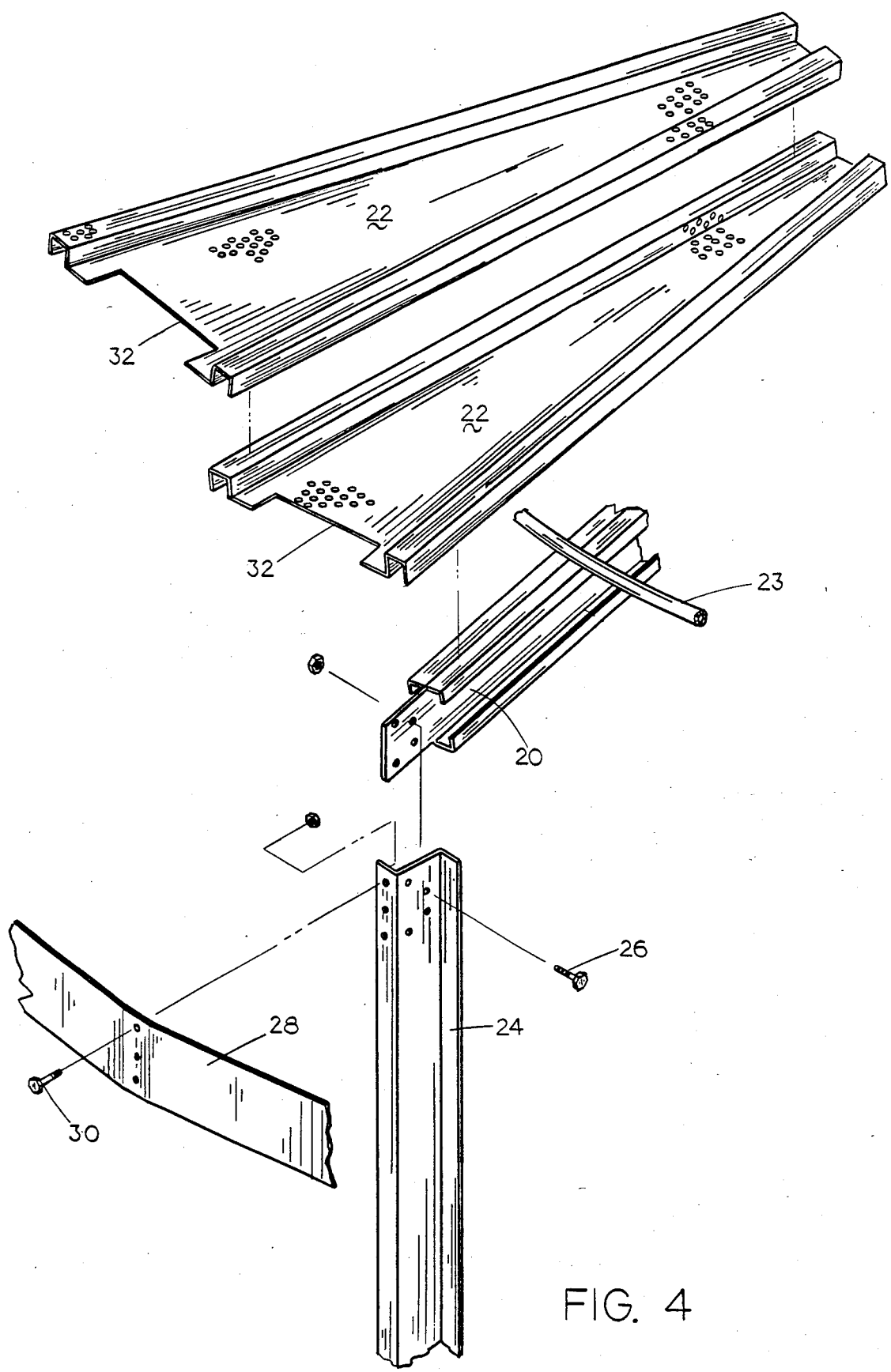
FIG. 4 is an exploded perspective view illustrating the manner in which the perforated floor is supported.
Figure 5:
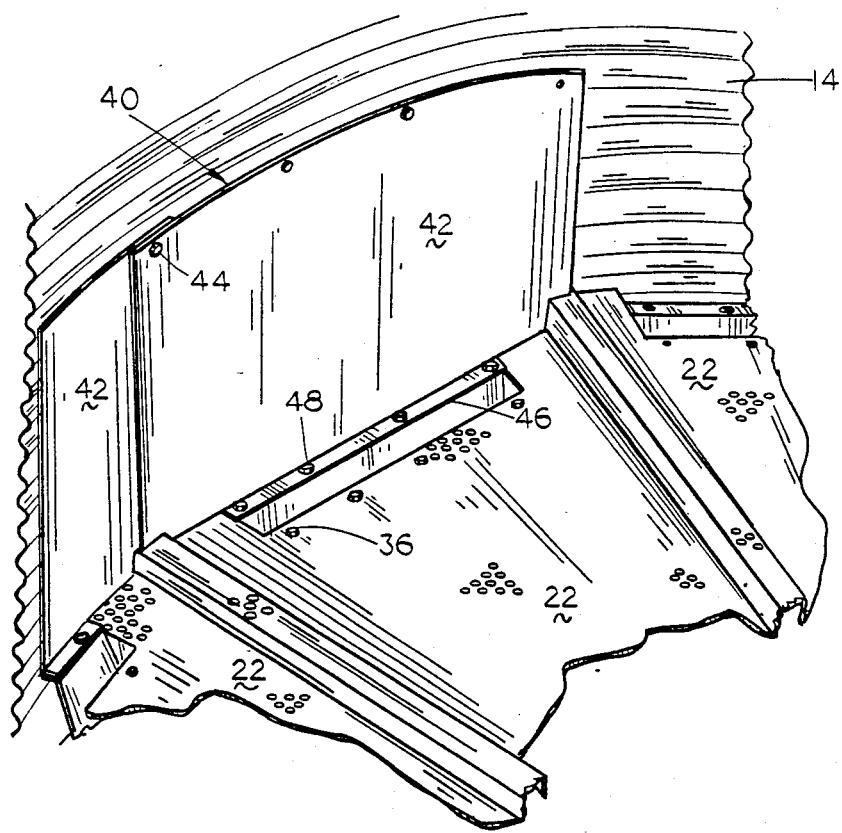
FIG. 5 is a partial perspective view illustrating the flashing system of this invention and its relationship to the drying floor and grain bin.
Figure 6:
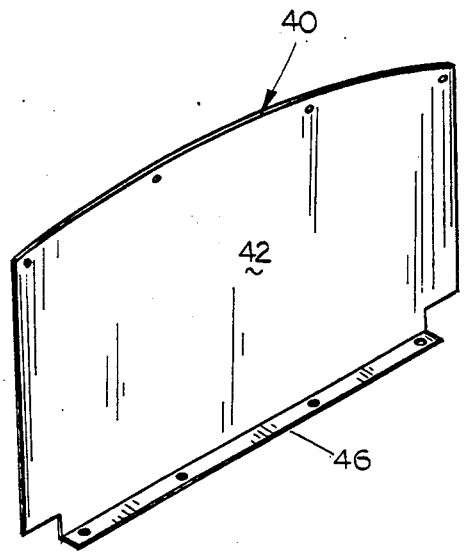
FIG. 6 is a perspective view of one panel of the flashing system.

The lower ends of the support members 20 are connected to a vertically disposed stiffener 24 by bolts 26. Each of the stiffeners 24 has a general Z-shape as best seen in FIG. 2. The lower ends of rafters 21 are bolted directly to the wall 14 and the tension band 28. The flat tension band 28 is positioned between the stiffeners 24 and the wall 14 and extends around the entire interior of the bin or around the entire lower end of the floor structure 12. Band 28 may be of a single length of metal material or comprised of a plurality of lengths bolted together. The ends of the band 28 overlap and are secured together by any convenient means such as by bolts or the like. Bolts 30 secure the rafters 20 and 21 to the band 28, stiffeners 24 and the wall 14 as seen in the drawings.

As seen in the drawings, the panels 22 have cut-out portions 32 at the lower ends thereof into which are inserted hoppers 34 which are secured to the panels 22 by bolts 36. A dump trough 38 is pivotally mounted at the lower end of each of the hoppers 34 and are controlled by dumping means such as disclosed in U.S. Pat. No. 3,501,845.

Figure 7:
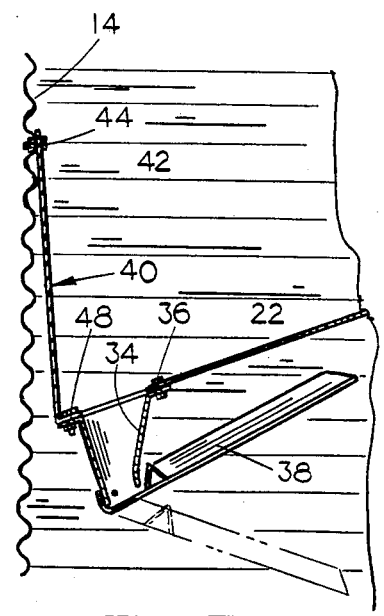
FIG. 7 is a sectional view illustrating the relationship of the flashing system to the grain drying floor and bin.

The improved flashing system of this invention is indicated generally by the reference numeral 40 and is preferably comprised of a plurality of members 42 which are bolted together in an end-to-end relationship by bolts 44. The ends of the members 42 overlap and extend around the entire inner surface of wall 14. As seen, the upper ends of members 42 are bolted to wall 14 by the bolts 44 above the lower ends of members 22. As best seen in FIG. 7, the flashing members 42 extend downwardly and inwardly from their upper ends to members 22. Each of the flashing members 42 is provided with an inwardly extending flange 46 which is secured to the hopper 34 by bolts 48.

As seen in the drawings, the flashing system, by extending downwardly and inwardly from the upper ends thereof, prevents the accumulation of grain at the lower ends of the drying floor. By preventing the accumulation of grain at the juncture of the drying floor and the wall of the grain bin, grain spoilage is prevented.

Thus it can be seen that the flashing system of this invention accomplishes at least all of its stated objectives.

We claim:

1. A grain drying bin comprising, a base floor, a cylindrical wall extending upwardly from said base floor, a roof mounted on the upper end of said wall, a conically-shaped drying floor positioned within the bin and having its lower periphery secured to said wall and extending upwardly in an inclined direction therefrom, said conically-shaped floor including a plurality of spaced-apart support members having upper and lower ends, and a perforated floor mounted on said support members, the lower ends of said support members being operatively secured to said cylindrical wall, said perforated floor having a plurality of spaced-apart openings formed therein at their lower ends inwardly of said cylindrical wall, a movable dump hopper means positioned in each of said openings, and a flashing means secured to the lower end of said drying floor and extending upwardly and outwardly therefrom, the upper end of said flashing means being secured to said cylindrical wall, the inclination of said flashing means serving to direct grain to said openings and to reduce the possible accumulation of grain on the lower end of said drying floor.

2. The bin of claim 1 wherein said flashing means comprises a plurality of flat members secured together in an end-to-end relationship.

* * * * *